(No Model.)

E. T. STARR.
PRIMARY OR GALVANIC BATTERY.

No. 321,917. Patented July 7, 1885.

WITNESSES:
Wm J. Peyton
Alan McL. Abert

INVENTOR:
Eli T. Starr,
by his Attys
Baldwin, Hopkins & Peyton

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

PRIMARY OR GALVANIC BATTERY.

SPECIFICATION forming part of Letters Patent No. 321,917, dated July 7, 1885.

Application filed January 8, 1885. (No model.)

*To all whom it may concern:*

Be it known that I, ELI T. STARR, of the city and county of Philadelphia, in the State of Pennsylvania, have invented certain new and useful Improvements in Primary or Galvanic Batteries, of which the following is a specification.

My invention relates to primary or galvanic batteries for generating electricity, and more particularly to that class of such batteries in which porous cells or partitions are used to separate two liquids of different specific gravity or of different characters in which the respective electrodes or battery-plates are immersed.

The object of my invention more particularly is to construct a battery combining great quantity and intensity with constancy of current.

By my improvements I have improved the construction and arrangement of the anode and cathode elements, and have so organized the battery or cell in connection with a porous cup or partition as to support said elements closely together, but out of contact, whereby the internal resistance of the cell is lessened. I have also improved the construction of the porous cup or partition and of the cover of the battery-cell.

All my improvements are first particularly described in detail as organized in the best way now known to me, and my said improvements are then specifically set forth in the claims at the close of this specification.

Some of the improvements herein claimed by me may be used without the others, and in batteries differing from that particularly described herein.

Figure 1:
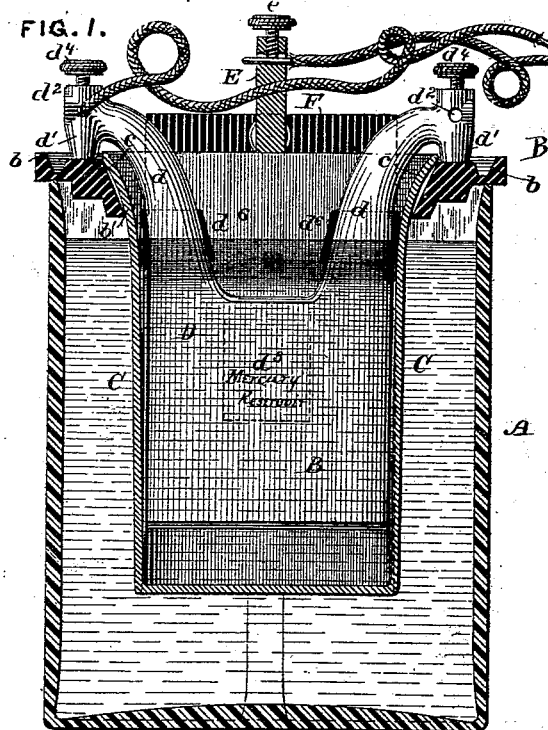
Figure 2:
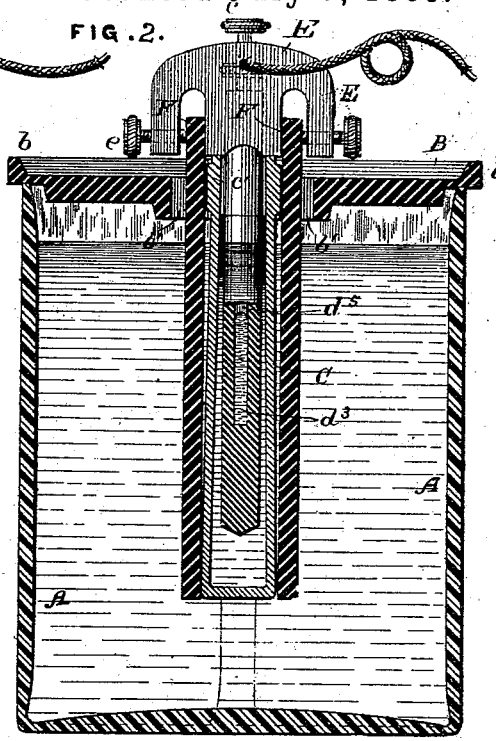
Figure 3:
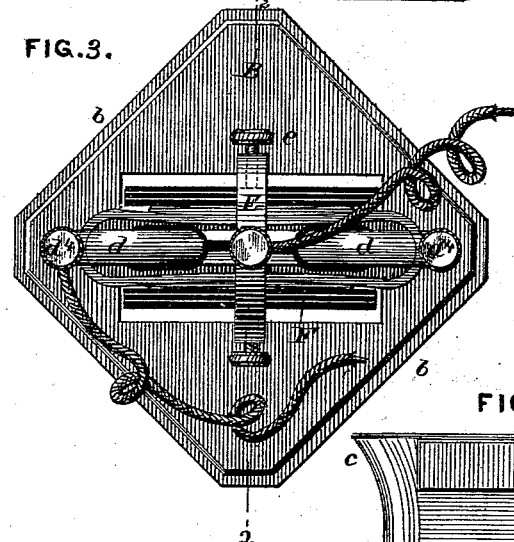
Figure 4:
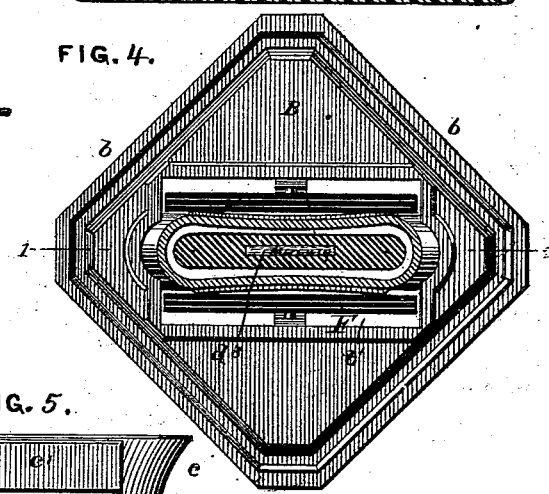
Figure 5:
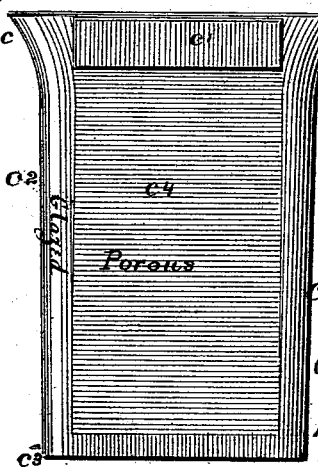

In the accompanying drawings, Figure 1 is a vertical central section through my improved battery on the line 1 1 of Fig. 4. Fig. 2 is a section at right angles to that depicted in Fig. 1 on the line 2 2 of Fig. 3. Fig. 3 is a top or plan view of the improved battery, and Fig. 4 a similar view with a portion of the porous cup and the anode or positive element in section. Fig. 5 is a view of the porous cup or partition detached.

The battery vessel or cell A, which may be of glass or other suitable material, is preferably provided with a top or cover, B, having a raised rim, $b$, around its edge to prevent the escape of any of the liquid of the battery which may find egress to the outer surface of said top and insure its return to the cell through a central opening, $b'$, in said cover. The battery-vessel A may be four-sided, as shown in the several figures of the drawings, or of other shape, as may be desired. A flat porous cup, C, is inserted through the opening in the cover B, and is supported at its upper end by means of lugs or a swelled enlargement, $c$, at the narrow sides or edges of the cup, which rest upon the cover, as most clearly shown in Figs. 1, 3, and 5. The flat sides of the porous cup C, near its upper edge, are provided with thickened pieces, ledges, or projections $c'$, which extend nearly across the flat sides of the cup. The object of these thickened pieces or shoulders will be presently explained. Said porous cup C is glazed or made non-porous on its narrow sides or edges $c^2 c^2$, and at its bottom $c^3$, and this glazed or non-porous portion extends around to the flat sides of the cup and includes the projections or shoulders $c'$ upon the flat sides of the cup, which have been above described. Said ledges or projections $c'$ terminate below the top edge of the cup, so as to prevent the fluid of the cell from lodging upon the edge of the cup, which fluid might produce a short circuit between the elements of the cell were a broad shoulder at the top edge of the cup presented for the lodgment of any of the liquid which might reach to the top of said cup. The flat sides $c^4$ of the cup C are porous or unglazed, and this porous portion of the cup is sufficiently illustrated in Fig. 5. It will thus be seen that I use in my improved cell a flat porous cup, the narrow edges, bottom, and top of which are glazed or rendered non-porous, while the broad flat sides of said cup are made porous for the electrical communication between the element or electrode within the cup and that at its sides, which will be presently explained.

The anode or positive plate D is a flat zinc plate, and is immersed in the porous cup, as clearly shown in the drawings. This plate D is provided at its upper end with two upwardly-projecting arms or members, $d\ d$, terminating in enlarged ends or heads $d'\ d'$, which extend over the upper edge of the porous cup and rest upon the top or cover of the battery-cell, and are thereby supported so that the zinc or anode plate is supported away from the bottom of the porous cup within which it is contained. The arms or members $d\ d$ of the zinc or anode plate D are substantially gooseneckced or curved, so as to carry their supporting-heads $d'\ d'$ outside the porous cup and enable them to rest upon the battery-cover and be supported by it, as before explained. The enlarged heads or ends $d'\ d'$ of the zinc plate D are preferably drilled with lateral holes $d^2\ d^2$ for the reception of the conducting wires, which may be fastened in place by means of the binding-posts $d^4\ d^4$, operating at right angles to and intersecting the openings $d^2\ d^2$, above described. Between the arms or members $d\ d$ of the plate D and in the body of said plate is formed a pocket, $d^5$, for the reception of mercury $d^3$, which will be distributed through the body and over the surface of the electrode, thus keeping it amalgamated.

I have described the arms or members $d\ d$ of the plate D as preferably curved or goosenecked. Said members are also preferably round or circular in cross-section, so as to be easily fitted with a ring or piece of rubber tubing, $d^6$, the purpose of which is to prevent the action of the fluid contained within the porous cup at its surface upon said arms or members, the rubber tubing preventing the action of the liquid at its surface and for a short distance above it upon said arms or members, thus greatly increasing the durability of the zinc plate.

When the anode or positive element D is of zinc, I preferably coat the conducting-wire, which is secured thereto by means of the binding-post aforesaid, with zinc prior to connecting the wire to the zinc plate, which application of a zinc coating at the end of the wire may be accomplished in different ways—for instance, by dipping the wire when properly cleansed into melted zinc covered with sal-ammoniac. This coating of the conducting-wire prior to fastening it to the zinc plate reduces the tendency to oxidation at the point of connection, it being a well-known fact that different metals in contact are more readily oxidized at the joints or connections by the passage of an electric current than where the metals in contact are of the same nature or kind, and this oxidation increases the resistance of the circuit at the point of connection, which is a disadvantage.

The cathode or negative element of the battery consists, preferably, of two flat carbon plates, F F, facing the flat sides $c^4$ of the porous cup C, one carbon plate being placed upon each side of said cup and held in position by means of a suitable clamp-plate, E, to which the carbon-plates are clamped by suitable set-screws, $e\ e$. The clamp-plate E with the carbon plates attached thereto rests upon the upper edge of the porous cup C and supports the carbon plates above the bottom of the cell and close to the sides of said cup but out of contact with the porous sides or portion of said cup, inasmuch as the carbons are prevented from touching said porous portion of the cup by reason of the projections or ledges $c'$ at the top of said cup and its glazed bottom, as clearly shown in Figs. 2, 3, and 4, for example. The conducting-wire of the cathode or carbon element may be soldered to the clamp-plate, or be fastened thereto by a transverse opening and binding-screw, or in any other suitable way.

The object in constructing the porous cup with the flat sides $c^4$ thereof porous only and the balance of the cup glazed is to prevent the absorption of the fluid at portions of the cup without the capacity of doing electrical work or assisting in the generation of an electrical current, and this glazing of the non-active or non-effective portions of the cup prevents useless and unnecessarily rapid mixing or equalizing of the fluids, which, when such takes place, causes the action of the battery to cease.

I prefer the carbon plates F to be corrugated longitudinally, so that the projections or ribs of the corrugation will be vertical. This corrugation of the carbon plates increases the surface and prevents lodgment of particles thereon, which would occur if the ribs extended horizontally or crosswise of the plate, and which might tend to short-circuit the battery.

I have neglected to say that I prefer to face the clamp E at the point where the carbons are clamped thereto and in contact therewith with platinum strips, whereby good contact between the clamp and carbons is insured.

The fluid I prefer to employ in my improved battery-cell is the ordinary bichromate of potash for the cell outside the porous cup and in which the carbon plates are immersed, while the fluid of the porous cup in which the zinc or anode plate is immersed and suspended is preferably water acidulated with a small quantity of sulphuric acid—say a ten per cent. solution—or the fluid may be bisulphate of mercury with ten per cent. of sulphuric acid added. By suspending the porous cup above the bottom of the battery jar or vessel and with the carbons suspended alongside of said cup the heavy or polarized fluid of the battery is allowed to fall clear of the carbon element; and so, also, by suspending the zinc electrode above the bottom of the porous cup the collection of salts of mercury upon the bottom of the zinc or anode electrode is prevented.

I have found by practical experience that a battery-cell, organized as hereinbefore described, is very efficient, and that it has the capacity, when at rest, of recruiting or building up, and this to an extent not known in other forms of batteries which have come under my notice.

My battery possesses considerable quantity and intensity, and is very constant in its action.

I claim herein as my invention—

1. A porous cup having portions thereof porous and other portions non-porous, and provided with projections, shoulders, or ledges to prevent contact between said porous portions of said cup and the battery plates or elements facing said porous portions of the cup, substantially as described.

2. A substantially flat porous cup having its broad sides porous, and provided with projections, ledges, or shoulders to prevent contact between said porous sides of the cup and the battery plates or elements facing said porous sides, substantially as described.

3. A substantially flat porous cup provided with lugs or enlargements at its upper end at its narrow edges constituting the supporting portions of said cup, substantially as described.

4. A porous cup provided with lugs or enlargements at its upper end constituting the supporting portions of the cup, and with projections or ledges by which the cathode or carbon plates or their equivalent are held away from the sides of said cup, substantially as described.

5. The flat-bodied zinc electrode for galvanic batteries having opposite goose-necked or curved supporting-arms, circular in cross-section, and fitted with tubes or bands of insulating material at the line of junction of air and electrolyte or battery fluid, substantially as described.

6. The anode or zinc element of a galvanic battery having a binding-screw to secure the conducting-wire thereto, said wire being, where it is connected with the anode plate, provided with a coating of zinc or with a coating of the same metal as that of which the anode plate is composed, substantially as described.

7. The combination, in a galvanic battery, of the battery-vessel and its cover, the porous cup fitted in said vessel, a flat-bodied zinc electrode fitted in said porous cup and having supporting-arms rising therefrom and resting upon the cover of said vessel, so as to be suspended therein, while readily removable therefrom, the carbon electrode plates fitted on opposite sides of said porous cup and outside thereof, and suitable battery-fluid in which said electrodes are immersed, substantially as described.

8. The combination of the battery cell or vessel, the cover thereof, the porous cup supported by said cover, the cathode or carbon element supported by said porous cup, and the anode or zinc element immersed in said cup, and provided with curved arms or members which extend up outside the cup and rest upon the cover of the battery-vessel to support said anode plate above the bottom of the porous cup, substantially as described.

9. The cathode or carbon plates clamped to a single conducting-plate and fitted to lie face to face with the porous sides of a porous cup containing the zinc or anode plate of the battery, said clamp-plate resting upon and being supported by the upper edge of said porous cup, substantially as described.

10. In a galvanic battery, the combination, with the electrodes and fluid thereof, of a battery cell or vessel and its cover, said cover having a raised rim or edge to prevent the escape of the battery-fluid that may find its way to the outside of the cell, and with an opening or channel in said cover to insure the return of said fluid to the cell, substantially as described.

In testimony whereof I have hereunto subscribed my name.

ELI T. STARR.

Witnesses:
WM. J. PEYTON,
E. EUGENE STARR.